United States Patent
Nemoto et al.

(10) Patent No.: US 12,552,314 B2
(45) Date of Patent: Feb. 17, 2026

(54) MONITORING DEVICE, STORAGE MEDIUM STORING COMPUTER PROGRAM FOR MONITORING, AND MONITORING METHOD

(71) Applicant: TOYOTA JIDOSHA KABUSHIKI KAISHA, Toyota (JP)

(72) Inventors: Hiromi Nemoto, Tokyo-to (JP); Masataka Sano, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/588,726

(22) Filed: Feb. 27, 2024

(65) Prior Publication Data
US 2024/0336192 A1 Oct. 10, 2024

(30) Foreign Application Priority Data
Apr. 10, 2023 (JP) .................................. 2023-063371

(51) Int. Cl.
*B60Q 9/00* (2006.01)
(52) U.S. Cl.
CPC ..................................... *B60Q 9/00* (2013.01)
(58) Field of Classification Search
CPC ....................................................... B60Q 9/00
USPC ........................................................ 340/439
See application file for complete search history.

(56) References Cited

U.S. PATENT DOCUMENTS

| | | | | |
|---|---|---|---|---|
| 5,761,630 | A * | 6/1998 | Sekine | G05D 1/0289 701/301 |
| 6,502,035 | B2 * | 12/2002 | Levine | G08G 1/205 340/467 |
| 8,014,918 | B2 * | 9/2011 | Adachi | G08G 1/0104 701/420 |
| 9,779,628 | B2 * | 10/2017 | Yamashiro | G08G 1/22 |
| 10,189,434 | B1 * | 1/2019 | Casaburo | G01C 21/3664 |
| 11,084,504 | B2 * | 8/2021 | Wray | B60W 30/18154 |
| 11,225,266 | B2 * | 1/2022 | Domeyer | B60W 60/00 |
| 11,926,259 | B1 * | 3/2024 | Joo | G08G 1/0967 |
| 2002/0019703 | A1 * | 2/2002 | Levine | B60Q 1/346 340/439 |

(Continued)

FOREIGN PATENT DOCUMENTS

| | | |
|---|---|---|
| JP | 10-217803 A | 8/1998 |
| JP | 2007-226666 A | 9/2007 |

(Continued)

*Primary Examiner* — Zhen Y Wu
(74) *Attorney, Agent, or Firm* — Sughrue Mion, PLLC

(57) ABSTRACT

A monitoring device has a processor configured to determine a degree to which a driver is participating in driving, determine whether a merging terrain exists in which an adjacent lane vanishes by merging with the traveling lane, within a predetermined range from a current location of the vehicle, and alert the driver to be attentive to vehicle surroundings regardless of whether or not the merging terrain exists, when it has been determined that the degree to which the driver is participating in driving is low and speed of the vehicle exceeds a reference speed, or to alert the driver to be attentive to the vehicle surroundings only when it has been determined that the merging terrain exists, when it has been determined that the degree to which the driver is participating in driving is low and the speed of the vehicle does not exceed the reference speed.

6 Claims, 6 Drawing Sheets

(56) References Cited

U.S. PATENT DOCUMENTS

| | | | | |
|---|---|---|---|---|
| 2007/0067100 | A1* | 3/2007 | Matsumoto | G01C 21/26 701/301 |
| 2009/0299615 | A1* | 12/2009 | Denaro | G01C 21/3658 707/999.107 |
| 2014/0019522 | A1* | 1/2014 | Weng | G06N 5/02 709/203 |
| 2014/0232560 | A1* | 8/2014 | Hawkes | G08G 1/095 340/905 |
| 2016/0101728 | A1* | 4/2016 | Chan | B60Q 9/00 340/447 |
| 2016/0339919 | A1* | 11/2016 | Habu | B60W 10/18 |
| 2017/0113673 | A1* | 4/2017 | Kokido | B60W 30/10 |
| 2017/0291545 | A1* | 10/2017 | Lai | G08G 1/166 |
| 2017/0365165 | A1* | 12/2017 | Landfors | G06F 16/182 |
| 2018/0129891 | A1* | 5/2018 | Ryu | G06V 20/59 |
| 2019/0111944 | A1* | 4/2019 | Nagahashi | B60W 50/14 |
| 2019/0213882 | A1* | 7/2019 | Sachs | G08G 1/096783 |
| 2019/0241187 | A1* | 8/2019 | Maus | B60W 30/18163 |
| 2019/0344714 | A1* | 11/2019 | Shen | B60W 50/14 |
| 2020/0160714 | A1* | 5/2020 | Inaba | B60W 30/095 |
| 2020/0217685 | A1* | 7/2020 | Koh | G01C 21/3602 |
| 2020/0307600 | A1* | 10/2020 | Sato | G08G 1/167 |
| 2020/0379460 | A1* | 12/2020 | Stent | G06V 10/82 |
| 2020/0410368 | A1* | 12/2020 | Hasegawa | G07C 5/0816 |
| 2021/0053586 | A1* | 2/2021 | Domeyer | B60W 60/00 |
| 2021/0188275 | A1* | 6/2021 | Matsumura | B60W 60/0053 |
| 2021/0253025 | A1 | 8/2021 | Akachi et al. | |
| 2021/0387632 | A1* | 12/2021 | Sugawara | B60W 50/023 |
| 2022/0250623 | A1* | 8/2022 | Miike | B60W 60/007 |
| 2022/0306158 | A1 | 9/2022 | Kiriki et al. | |
| 2023/0048886 | A1* | 2/2023 | Fang | H04L 51/58 |
| 2023/0093546 | A1* | 3/2023 | Guo | H04W 4/02 701/117 |
| 2023/0311950 | A1 | 10/2023 | Kume et al. | |
| 2023/0356653 | A1* | 11/2023 | Nagata | B60Q 1/525 |

FOREIGN PATENT DOCUMENTS

| | | |
|---|---|---|
| JP | 2017-151606 A | 8/2017 |
| JP | 2019-191788 A | 10/2019 |
| JP | 2022-115055 A | 8/2022 |
| JP | 2022-148761 A | 10/2022 |

* cited by examiner

MONITORING DEVICE, STORAGE MEDIUM STORING COMPUTER PROGRAM FOR MONITORING, AND MONITORING METHOD

FIELD

The present disclosure relates to a monitoring device, a storage medium storing a computer program for monitoring, and a monitoring method.

BACKGROUND

A vehicle-mounted monitoring device monitors the state of the driver even while the vehicle is traveling by self-driving control (see Japanese Unexamined Patent Publication No. 2007-226666, for example).

While monitoring the state of the driver, the monitoring device monitors whether or not the driver is attentive to the surroundings of the vehicle without being distracted. For example, the driver may be eating or operating a navigation device when the speed of the vehicle is slow. Since the driver in this state is not looking toward the traveling direction of the vehicle, the monitoring device may determine that the driver is distracted.

However, in a case where the driver has recognized that the speed of the vehicle is slow and is eating or operating the navigation device, if the driver is advised to not be distracted, they may consider such a notification to be unpleasant.

The monitoring device therefore avoids advising the driver to not be distracted, even if the monitoring device has determined that the driver is distracted when the speed of the vehicle is slow. According to established standards for driver monitoring, it is not necessary to send an alert during periods of slow vehicle speed, even if the driver is not attentive to the surroundings of the vehicle.

SUMMARY

Vehicle traveling terrains include merging terrains, where an adjacent lane that is adjacent to the traveling lane in which the vehicle is traveling vanishes by merging. In a merging terrain, other vehicles traveling in an adjacent lane move into the traveling lane. The adjacent lane becomes congested in a merging terrain, with other vehicles stopping or moving while traveling in the adjacent lane, and often an automatic control system mounted in a vehicle is unable to accurately detect the locations and speeds of such other vehicles.

When the automatic control system has determined that the vehicle cannot be safely controlled by self-driving, it requests for driving of the vehicle to be transferred to the driver.

If the driver is distracted, however, they may not accurately recognize the state of the vehicle surroundings, and may need time to begin driving the vehicle.

In such terrain it is essential for the driver to be attentive to the surroundings even with a slow speed of the vehicle, but automatic control systems have been unable to advise drivers to not be distracted, even if they are distracted.

It is therefore an object of the present disclosure to provide a monitoring device that, in the case of a merging terrain, can alert a driver to be attentive to the vehicle surroundings even if the speed of the vehicle is at or below a predetermined reference speed.

(1) According to one embodiment, the invention provides a monitoring device. The monitoring device has a processor configured to determine a degree to which a driver is participating in driving, determine whether or not a merging terrain exists in which an adjacent lane that is adjacent to a traveling lane in which a vehicle is traveling vanishes by merging with the traveling lane, within a predetermined range from a current location of the vehicle in a traveling direction, and alert the driver to be attentive to vehicle surroundings regardless of whether or not the merging terrain exists, when it has been determined that the degree to which the driver is participating in driving is low and speed of the vehicle exceeds a reference speed, or alert the driver to be attentive to the vehicle surroundings only when it has been determined that the merging terrain exists, when it has been determined that the degree to which the driver is participating in driving is low and the speed of the vehicle does not exceed the reference speed.

(2) In the monitoring device of embodiment (1) above, it is preferable that the processor be further configured to determine that the degree to which the driver is participating in driving is low when the driver is distracted or the driver feels drowsy.

(3) In the monitoring device of embodiment (2) above, it is preferable that the processor be further configured to determine whether or not the driver is distracted using a determination scale for a direction in which the driver is gazing, and change the determination scale based on the current location of the vehicle and the location of the merging terrain, when it has been determined that the merging terrain exists.

(4) In the monitoring device according to any one of embodiment s (1) to (3) above, it is preferable that the reference speed is preferably in a range of 10 km/hr to 20 km/hr.

(5) According to another embodiment, a storage medium storing a computer program for monitoring is provided. The computer program for monitoring causes a processor to execute a process and the process includes determining a degree to which a driver is participating in driving, determining whether or not a merging terrain exists in which an adjacent lane that is adjacent to a traveling lane in which a vehicle is traveling vanishes by merging with the traveling lane, within a predetermined range from a current location of the vehicle in a traveling direction; and alerting the driver to be attentive to vehicle surroundings regardless of whether or not the merging terrain exists, when it has been determined that the degree to which the driver is participating in driving is low and speed of the vehicle exceeds a reference speed, or alerting the driver to be attentive to the vehicle surroundings only when it has been determined that the merging terrain exists, when it has been determined that the degree to which the driver is participating in driving is low and the speed of the vehicle does not exceed the reference speed.

(6) According to yet another embodiment of the invention there is provided a monitoring method. The monitoring method is carried out by a driver monitoring device and includes determining a degree to which a driver is participating in driving, determining whether or not a merging terrain exists in which an adjacent lane that is adjacent to a traveling lane in which a vehicle is traveling vanishes by merging with the traveling lane, within a predetermined range from a current location of the vehicle in a traveling direction; and alerting the driver to be attentive to vehicle surroundings regardless of whether or not the merging terrain exists, when it has been determined that the degree to which the driver is participating in driving is low and speed of the vehicle exceeds a reference speed, or alerting the driver to be attentive to the vehicle surroundings only when it has been determined that the merging terrain exists, when it has been determined that the degree to which the driver is participating in driving is low and the speed of the vehicle does not exceed the reference speed.

The monitoring device of the disclosure, in the case of merging terrain, can alert a driver to be attentive to the vehicle surroundings even if the speed of the vehicle is at or below a predetermined reference speed, and can thereby motivate the driver to be attentive to the surroundings of the vehicle.

The object and advantages of the invention will be realized and attained by means of the elements and combinations particularly indicated in the claims. It is to be understood that both the foregoing general description and the following detailed description are exemplary and explanatory and are not restrictive of the invention, as claimed.

DESCRIPTION OF EMBODIMENTS

Figure 1:
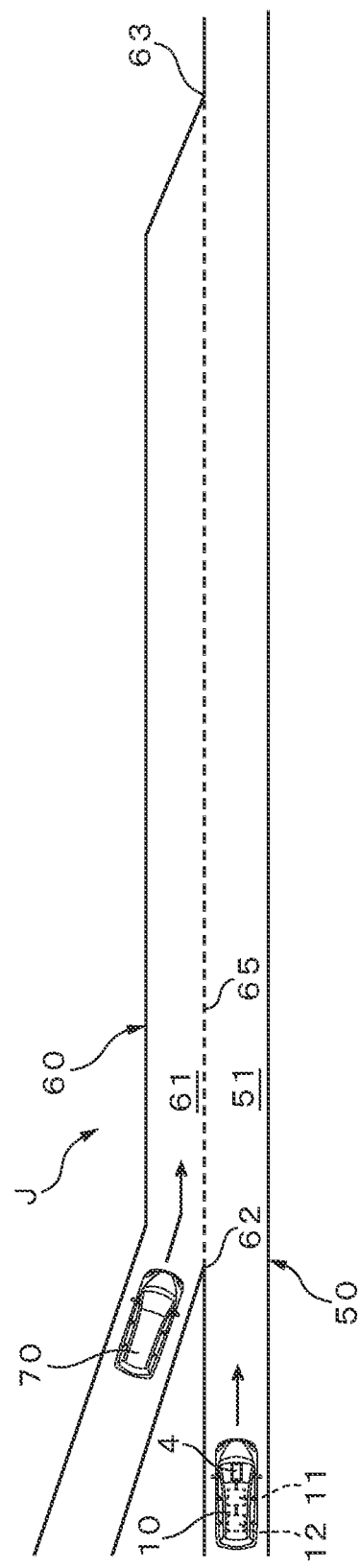
FIG. 1 is a diagram illustrating operation of a monitoring device of the embodiment in overview.

FIG. 1 is a diagram illustrating operation of a monitoring device of the embodiment in overview. Operation of the monitoring device of this embodiment will be explained in overview with reference to FIG. 1.

As shown in FIG. 1, a vehicle 10 travels on one lane 51 of a road 50. The vehicle 10 is traveling straight on the traffic lane 51 of the road 50.

A merging terrain J exists where a road 60 merges with the road 50 ahead of the current location of the vehicle 10. In the merging terrain J, a lane 61 and a lane 51 of the road 60 are connected between an adjacent start location 62 where the lane 61 begins to be adjacent to the lane 51, and an adjacent end location 63 where the lane 61 ceases to be adjacent to the lane 51.

The lane 61 and lane 51 are divided by a lane marking line (lane boundary line) 65. The traffic lane 61 is an adjacent lane which is adjacent to the lane 51 in which the vehicle 10 is traveling, via the lane marking line 65.

The vehicle 10 has an automatic control device 11 and a monitoring device 12. The automatic control device 11 has a self-driving mode wherein the vehicle 10 is driven primarily by the automatic control device 11 (for example, driving mode with levels 3 to 5) and a manual driving mode in which the vehicle 10 is driven primarily by the driver (not shown) of the vehicle 10 (for example, driving mode with levels 0 to 2). The vehicle 10 may also be a self-driving vehicle.

The monitoring device 12 determines that a merging terrain J exists in which the traffic lane 61 adjacent to the traffic lane 51 in which the vehicle 10 is traveling vanishes by merging with the traffic lane 51, within a predetermined range from the current location of the vehicle 10 in the traveling direction. In the merging terrain J, another vehicle 70 traveling in the traffic lane 61 is moving into the traffic lane 51 in which the vehicle 10 is traveling.

The monitoring device 12 determines the degree to which the driver is participating in driving, based on a monitor image acquired by a monitoring camera 4. When the driver is distracted or the driver feels drowsy, for example, the monitoring device 12 determines that the degree to which the driver is participating in driving is low. When the driver is gazing in the traveling direction of the vehicle 10 or the driver does not feel drowsy, on the other hand, the monitoring device 12 determines that the degree to which the driver is participating in driving is high.

Since it has been determined that a merging terrain J exists, the monitoring device 12 alerts the driver to be attentive to the surroundings of the vehicle 10 when the speed of the vehicle 10 is at or below the reference speed and the degree to which the driver is participating in driving is low.

However, when the speed of the vehicle 10 is above the reference speed and the degree to which the driver is participating in driving is low, the monitoring device 12 alerts the driver to be attentive to the surroundings of the vehicle 10 regardless of the whether or not the terrain is merging terrain. The reference speed may be in the range of 10 km/hr to 20 km/hr, for example.

When the speed of the vehicle 10 is at or below the reference speed and the degree to which the driver is participating in driving is low, the monitoring device 12 does not alert the driver to be attentive to the surroundings of the vehicle 10 if there is no merging terrain J.

When the speed of the vehicle 10 is slow, the driver may be eating, operating a navigation device or checking an adjacent lane. Under such conditions, the driver may find it unpleasant to be notified by an alert.

In merging terrain J, however, since the other vehicle 70 traveling in the traffic lane 61 is moving into the traffic lane 51 in which the vehicle 10 is traveling, the other vehicle 70 and the vehicle 10 can potentially approach each other.

When the automatic control device 11 has determined that the vehicle 10 cannot be safely controlled by self-driving, it notifies the driver of a control transfer request for driving of the vehicle 10 to be transferred to the driver.

If it has been determined that a merging terrain J exists, the monitoring device 12 alerts the driver to be attentive to the surroundings of the vehicle 10, even when the speed of the vehicle 10 is at or below the reference speed and the degree to which the driver is participating in driving is low.

The driver can thereby be made aware of the merging terrain J and the other vehicle 70. The driver, having been notified of the control transfer request, can then promptly begin driving of the vehicle 10.

As explained above, when the merging terrain J exists, the monitoring device 12 of the embodiment can alert the driver to be attentive to the surroundings of the vehicle 10 even if the speed of the vehicle 10 is at or below the reference speed, and can thereby motivate the driver to be attentive to the surroundings of the vehicle 10.

Figure 2:
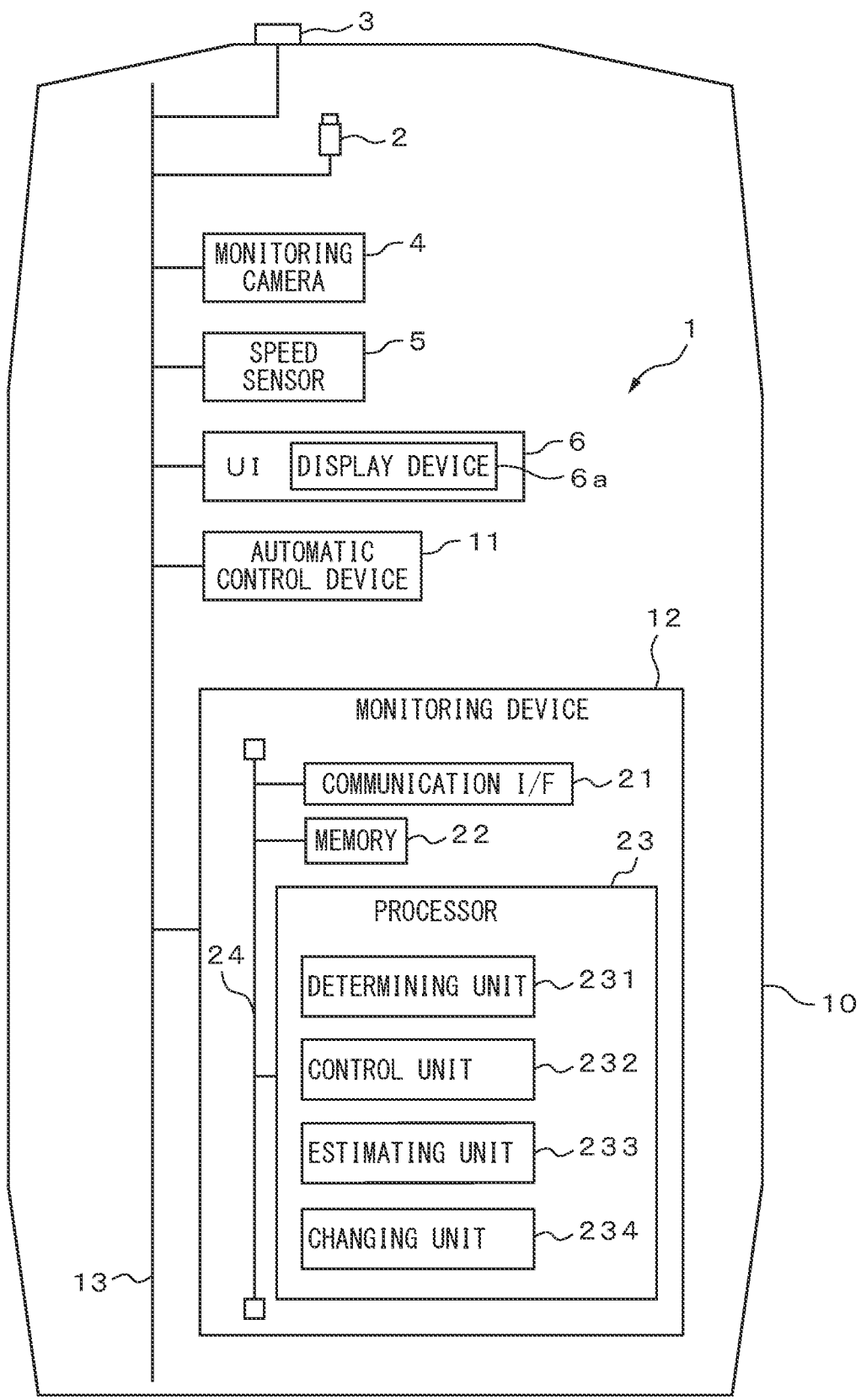
FIG. 2 is a hardware configuration diagram for a vehicle in which the monitoring device of the embodiment is mounted.

FIG. 2 is a hardware configuration diagram of a vehicle 10 in which a monitoring system 1 is mounted that includes a monitoring device 12 of the embodiment. The vehicle 10 has a front camera 2, a LiDAR sensor 3, a monitoring camera 4, a speed sensor 5, a user interface (UI) 6, an automatic control device 11 and a monitoring device 12. The monitoring system 1 includes at least the monitoring camera 4, the speed sensor 5 and the monitoring device 12.

The front camera 2, LiDAR sensor 3, monitoring camera 4, speed sensor 5, UI 6, automatic control device 11 and monitoring device 12 are connected in a communicable manner via an in-vehicle network 13 conforming to the Controller Area Network standard.

The front camera 2 is an example of an imaging unit provided in the vehicle 10. The front camera 2 is mounted on the vehicle 10 and directed toward the front of the vehicle 10. The front camera 2 acquires a camera image in which the environment of a region in a predetermined visual field ahead of the vehicle 10 is shown, at a camera image acquisition time set with a predetermined cycle, for example. The camera image can show the road in the predetermined region ahead of the vehicle 10, and road features such as surface lane marking lines on the road. The front camera 2 has a 2D detector composed of an array of photoelectric conversion elements with visible light sensitivity, such as a CCD or C-MOS, and an imaging optical system that forms an image of the photographed region on the 2D detector. The camera image is an example of surrounding environment information.

Each time a camera image is acquired, the front camera 2 outputs the camera image and the camera image photograph time through the in-vehicle network 13 to the automatic control device 11. The camera image is also used for processing at the automatic control device 11 to estimate the location of the vehicle 10. At the automatic control device 11, the camera image is also used for processing to detect objects surrounding the vehicle 10.

The LiDAR sensor 3 is mounted on the outer side of the vehicle 10, for example, being directed toward the front of the vehicle 10. The LiDAR sensor 3 emits a scanning laser toward the predetermined visual field in front of the vehicle 10, at a reflected wave information acquisition time set with a predetermined cycle, and receives a reflected wave that has been reflected from a reflector. The time required for the reflected wave to return contains information for the distance between the vehicle 10 and objects located in the direction in which the laser has been emitted. The LiDAR sensor 3 outputs the reflected wave information that includes the laser emission direction and the time required for the reflected wave to return, together with the reflected wave information acquisition time at which the laser was emitted, through the in-vehicle network 13 to the automatic control device 11. At the automatic control device 11, the reflected wave information is used for processing to detect objects surrounding the vehicle 10. The reflected wave information is an example of surrounding environment information.

The monitoring camera 4 is disposed inside the vehicle in a manner allowing it to acquire monitor images including the face of the driver driving the vehicle 10. The monitoring camera 4 is disposed on the steering column, for example. The monitoring camera 4 is an example of an image acquisition unit. The monitoring camera 4 acquires a monitor image representing the surroundings of the driving seat at a monitor image acquisition time at a predetermined cycle. The monitor image is an example of information representing the state of the driver.

The monitoring camera 4 has a 2D detector composed of an array of photoelectric conversion elements with infrared sensitivity, such as a CCD or C-MOS, and an imaging optical system that forms an image of the acquired region on the 2D detector.

Each time a monitor image is acquired, the monitoring camera 4 outputs the monitor image and the image acquisition time at which the monitor image was acquired, to the monitoring device 12 via the in-vehicle network 13. The monitor image is used by the monitoring device 12 to estimate the degree to which the driver is participating in driving.

The speed sensor 5 detects speed information representing the speed of the vehicle 10. The speed sensor 5 has a measuring device that measures the rotational speed of the tires of the vehicle 10 per unit time. The speed sensor 5 outputs the speed information to the automatic control device 11 and monitoring device 12 via the in-vehicle network 13. The speed information is used for processing by the automatic control device 11 and monitoring device 12 to calculate the speed of the vehicle 10.

The UI 6 is an example of the notification unit. The UI 6 is controlled by the automatic control device 11 and monitoring device 12 to provide the driver with alerts to be attentive to the surroundings of the vehicle 10 and notifications of information relating to the vehicle 10, such as control transfer requests. The UI 6 has a display device 6a such as a liquid crystal display or touch panel, for display of information relating to the vehicle 10. The UI 6 may also have an acoustic output device (not shown) to notify the driver of information relating to the vehicle 10. The UI 6 also has a touch panel or operating button, for example, as an input device for inputting operation information from the driver to the vehicle 10. The UI 6 outputs the input operation information to the automatic control device 11 or monitoring device 12 via the in-vehicle network 13.

The automatic control device 11 controls operation of the vehicle 10. The automatic control device 11 has a self-driving mode in which the vehicle 10 is driven by automatic control, and a manual driving mode in which operation of the vehicle 10 is controlled based on driver manipulation. In self-driving mode, the vehicle 10 is driven primarily by the automatic control device 11. In self-driving mode, the automatic control device 11 controls operations such as steering, engine actuation and braking based on detection information from sensors (not shown) mounted in the vehicle 10.

In manual driving mode, the vehicle 10 is driven primarily by the driver. In manual driving mode, the automatic control device 11 controls operation of the vehicle 10 including steering, engine actuation and braking based on manipulation by the driver. In manual driving mode, the automatic control device 11 controls operation of the vehicle 10 based on operation of at least one from among the steering wheel, brake pedal and accelerator pedal (not shown) by the driver.

Driving of the vehicle 10 primarily by automatic control device 11 means that the automatic control device 11 controls the operations of steering, actuation and braking, without participation by the driver. Driving of the vehicle 10 primarily by the driver means that the driver controls at least one of the operations from among steering, actuation and braking.

The automatic control device 11 may also have multiple self-driving levels in self-driving mode. As referred to herein, such multiple self-driving levels may include common self-driving levels of 3 to 5. Likewise, manual driving mode may include common self-driving levels of 0 to 2.

The automatic control device 11 detects objects such as other vehicles around the vehicle 10, based on camera images and reflected wave information. In self-driving mode, when a spacing of at least a predetermined distance cannot be maintained between the vehicle 10 and an object, the automatic control device 11 notifies the driver of a control transfer request to switch main driving of the vehicle 10 from the automatic control device 11 to the driver, via the UI 6. In self-driving mode, the automatic control device 11 notifies the driver of a control transfer request to switch driving from the automatic control device 11 to the driver, via the UI 6, before entering a region where driving by automatic control is not allowed. A region where driving by automatic control is not allowed may be a region where high-precision map information has not been provided. In self-driving mode, the automatic control device 11 also notifies the driver of a control transfer request via the UI 6 when it has been determined that driving of the vehicle 10 cannot be safely controlled due to a sensor malfunction.

Once the driver has been notified of the control transfer request, the automatic control device 11 carries out control switching so that control of the vehicle 10 is switched to the driver, at a predetermined control switching time. If no acknowledgement action by the driver for the control transfer request can be confirmed within the control switching time, the automatic control device 11 safely stops the vehicle 10 (Minimal Risk Maneuver Processing).

Based on the navigation map information, the destination location of the vehicle 10 input from the UI 6, and positioning information representing the current location of the vehicle 10, the automatic control device 11 creates a navigation route from the current location to the destination location of the vehicle 10. In self-driving mode, the automatic control device 11 generates a driving plan for the vehicle based on the navigation route and map information. The automatic control device 11 controls each unit of the vehicle 10 based on the driving plan. High-precision map information may be used as the map information. The high-precision map information includes three-dimensional information for the road surface, the speed limit for the road, the curvature of the road, and information for the types and locations of structures and road features such as road lane marking lines.

The automatic control device 11 outputs the current location of the vehicle, the navigation route and the map information including the current location of the vehicle to the monitoring device 12 via the in-vehicle network 13.

The monitoring device 12 carries out determination processing, control processing, estimation processing and change processing. For this purpose, the monitoring device 12 has a communication interface (IF) 21, a memory 22 and a processor 23. The communication interface 21, memory 22 and processor 23 are connected via signal wires 24. The communication interface 21 has an interface circuit to connect the monitoring device 12 with the in-vehicle network 13.

The memory 22 is an example of a memory unit, and it has a volatile semiconductor memory and a non-volatile semiconductor memory, for example. The memory 22 stores an application computer program and various data to be used for information processing carried out by the processor 23 of each device.

All or some of the functions of the monitoring device 12 are functional modules driven by a computer program operating on the processor 23, for example. The processor 23 has a determining unit 231, a control unit 232, an estimating unit 233 and a changing unit 234. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphics processing unit. Operation of the monitoring device 12 will be described in detail below.

The automatic control device 11 and monitoring device 12 are electronic control units (ECU), for example. For FIG. 2, the automatic control device 11 and the monitoring device 12 were described as separate devices (for example, the Electronic Control Unit: ECU), but all or some of the devices may also be constructed as a single device.

Figure 3:
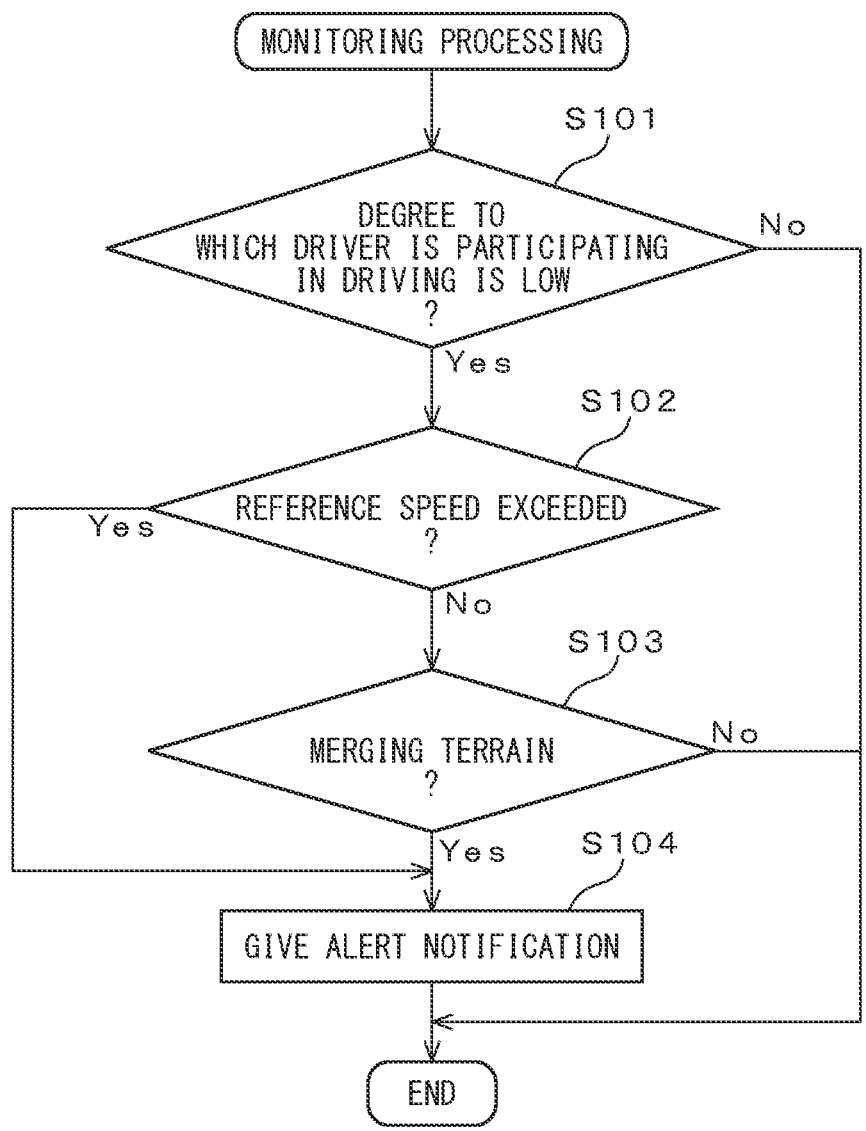
FIG. 3 is an example of an operation flow chart for monitoring processing by the monitoring device of the embodiment.

FIG. 3 is an example of an operation flow chart for monitoring processing by the monitoring device 12 of the embodiment. The monitoring device 12 carries out monitoring processing according to the operation flow chart shown in FIG. 3, at a monitoring time at a predetermined cycle. The cycle for the monitoring time may be from 10 to 60 seconds, for example.

First, the determining unit 231 determines whether the degree to which the driver is participating in driving is low, based on information representing the state of the driver (step S101). A monitor image is used as the information representing the state of the driver. The cycle for the monitoring time is preferably equal to or longer than the cycle for the monitor image acquisition time. Determination processing in which the determining unit 231 determines the degree to which the driver is participating in driving will be described below. The determining unit 231 may also determine the degree to which the driver is participating in driving as a numerical value, instead of only determining whether it is high or low.

When the degree to which the driver is participating in driving is low (step S101—Yes), the determining unit 231 determines whether or not the speed of the vehicle 10 is above the reference speed (step S102). The determining unit 231 calculates the speed of the vehicle 10 based on speed information. For example, the determining unit 231 may calculate the most recent average speed of the vehicle 10. The reference speed is in a range of 10 km/hr to 20 km/hr, for example. When the speed of the vehicle 10 is in the range of 10 km/hr to 20 km/hr, this may mean that the traveling lane in which the vehicle 10 is traveling is congested. The reference speed may be 10 km/hr or lower.

When the traveling lane in which the vehicle 10 is traveling is congested in merging terrain, the adjacent lane that vanishes by merging with the traveling lane is also likely congested.

When the speed of the vehicle 10 is at or below the reference speed (step S102—No), the determining unit 231 determines whether or not a merging terrain exists where an adjacent lane that is adjacent to the traveling lane in which the vehicle 10 is traveling vanishes by merging with the traveling lane, within a predetermined range ahead on the course of the vehicle 10 from the current location of the vehicle 10 (step S103). Specifically, the determining unit 231 determines whether or not a merging terrain exists within the nearest driving zone of the navigation route, based on the current location of the vehicle 10, the navigation route and the map information.

In merging terrain it is sometimes the case that another road merges with the road on which the vehicle 10 is traveling and an adjacent lane that is adjacent to the traveling lane vanishes by merging with the traveling lane (see FIG. 1). In addition, it is sometimes the case in merging terrain that an adjacent lane that is adjacent to the traveling lane vanishes by merging with the traveling lane, within the road on which the vehicle 10 is traveling (for example, terrain including an upwardly inclined lane). It is determined that a merging terrain exists up until the vehicle 10 passes through a merge end location where connection between the traveling lane and the adjacent lane ends.

The predetermined range may be a predetermined distance decided based on the speed of the vehicle 10. The speed of the vehicle 10 may be the legal speed limit for the road, the speed limit, or the most recent average speed of the vehicle 10. Sight distance, for example, may be used as the predetermined distance that is decided based on the speed of the vehicle 10. Sight distance is established for each legal speed limit, being the visible distance for drivers, and most road structures are built during road construction so as not to impede the visual field of drivers. The location for beginning to determine whether or not a merging terrain exists is preferably set at a location where the merging terrain is visible to the driver.

When a merging terrain exists (step S103—Yes), the control unit 232 notifies the driver of an alert to be attentive to the surroundings of the vehicle 10, via the UI 6 (step S104), and the series of processing steps is complete. The control unit 232 alerts the driver by, for example, displaying the character information and/or image data on the UI 6. The control unit 232 may also alert the driver using voice data, via the UI 6.

When the traveling lane is congested and the speed of the vehicle 10 is slow, the driver may be eating or operating the UI 6. In merging terrain, the driver may also be checking an adjacent lane.

When an adjacent lane becomes congested near a merging terrain and another vehicle traveling in the adjacent lane stops or moves, the automatic control device 11 may not be able to accurately detect the locations and speeds of the other vehicle.

Since in the merging terrain J the other vehicle traveling in the adjacent lane is moving into the traveling lane in which the vehicle 10 is traveling, the other vehicle and the vehicle 10 can potentially approach each other. When the automatic control device 11 has determined that the vehicle 10 cannot be safely controlled by self-driving, it notifies the driver of a control transfer request for driving of the vehicle 10 to be transferred to the driver.

In merging terrain, therefore, even when the speed of the vehicle 10 is slow, it is necessary for the driver to have a high degree of participation in driving of the vehicle 10 so as to be attentive to the surroundings of the vehicle 10.

Therefore when the degree to which the driver is participating in driving is low and the speed of the vehicle 10 is slow, the monitoring device 12 alerts the driver to be attentive to the surroundings of the vehicle 10 only when a merging terrain exists.

When the speed of the vehicle 10 is above the reference speed (step S102—Yes), the control unit 232 notifies the driver to be attentive to the surroundings of the vehicle 10, via the UI 6 (step S104), and the series of processing steps is complete. When the speed of the vehicle 10 is fast, the alert is given regardless of whether or not a merging terrain exists.

When the degree to which the driver is participating in driving is high (step S101—No), however, or when no merging terrain exists (step S103—No), the monitoring device 12 completes the series of processing steps. If the degree to which the driver is participating in driving is high, it may be that the driver is being attentive to the area surrounding the vehicle 10. When no merging terrain exists, excessive notifying of the driver by alerts while the speed of the vehicle 10 is at or below the reference speed may cause the driver to feel displeasure from the alerts. Such minimalistic alerting of the driver conforms to standards for driver monitoring.

Figure 4:
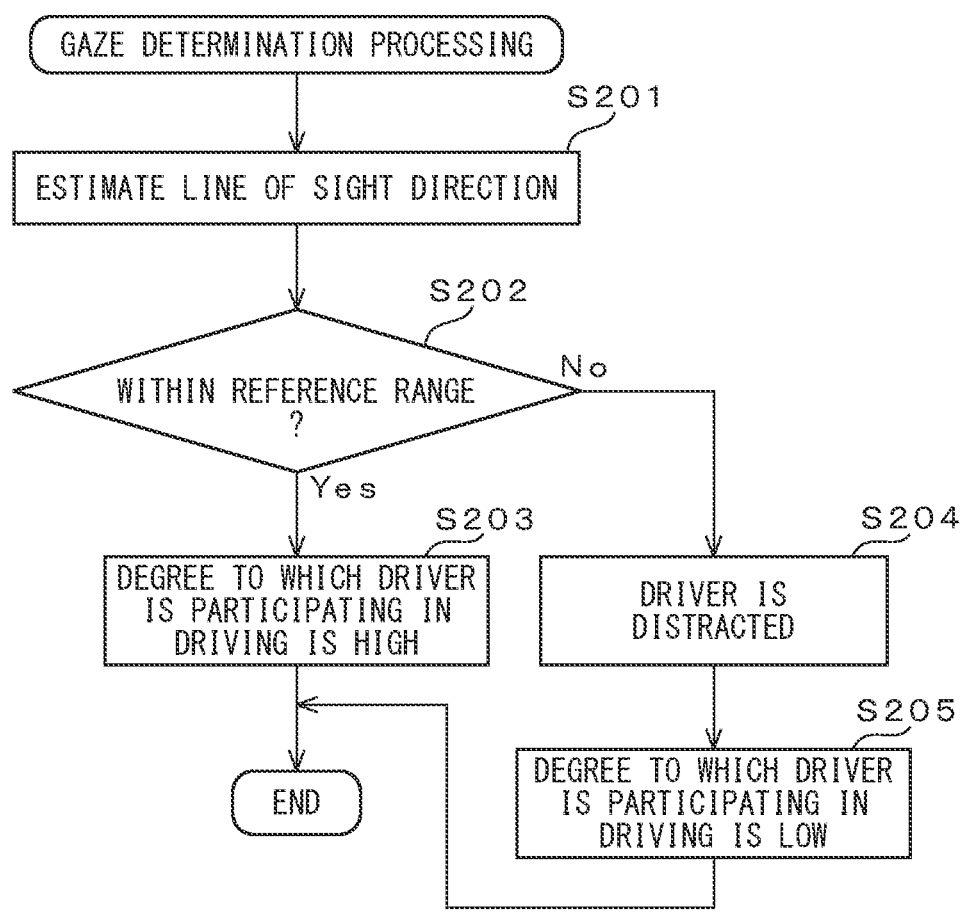
FIG. 4 is an example of an operation flow chart for gaze determination processing by the monitoring device of the embodiment.

Determination processing for determining the degree to which the driver is participating in driving will now be explained with reference to FIG. 4. FIG. 4 is an example of an operation flow chart for gaze determination processing by the monitoring device of the embodiment. The monitoring device 12 carries out gaze determination processing according to the operation flow chart shown in FIG. 4, at a gaze determining time at a predetermined cycle. The cycle of the gaze determining time is preferably shorter than the cycle of the monitoring time. Gaze determination processing is an example of distraction determination processing.

First, the estimating unit 233 estimates the line of sight direction of the driver based on a monitor image (step S201). The estimating unit 233 has a configuration including a classifier that has been trained to detect certain parts of the face such as eye corners, inner eyes and pupil centers as facial feature points, by input of monitor images. The classifier inputs monitor images and detects the types and locations of facial feature points within the monitor images.

The classifier is a convolutional neural network (CNN) having multiple layers connected in series from the input end to the output end, for example. Images including the facial feature points are previously input into the CNN as teacher data for learning, whereby the CNN functions as a classifier to classify types and locations of facial feature points. A machine learning model such as a support vector machine or random forest may also be used as the classifier.

The estimating unit 233 then uses the facial feature points to estimate the direction of the line of sight of the driver. The estimating unit 233 calculates the eye center locations based on the eye corner and inner eye locations. For example, the estimating unit 233 sets the eye center locations to be the locations at predetermined distances in predetermined directions from the midpoints of line segments connecting the eye corner locations and inner eye locations. The estimating unit 233 estimates the line of sight direction to be the direction connecting the eye center locations and the pupil center locations. The line of sight direction for the driver is represented by the angle in the horizontal direction and the angle in the vertical direction, with respect to the traveling direction of the vehicle 10. The estimating unit 233 may also estimate the line of sight direction based on only either one of the left and right eyes of the driver. The estimating unit 233 may also estimate the line of sight directions of both the left and right eyes, and use the average orientation as the line of sight direction. The estimating unit 233 may also estimate the line of sight direction of the driver based on the locations of the pupil centers as facial feature points, and Purkinje images.

The determining unit 231 then determines whether or not the line of sight direction of the driver is within a predetermined reference range (step S202). The determining unit 231 determines whether or not the line of sight direction of the driver is within the predetermined reference range as the angle in the horizontal direction and the angle in the perpendicular direction with respect to the traveling direction of the vehicle 10.

When the line of sight direction of the driver is within the predetermined angle range on the right side or within the predetermined angle range on the left side with respect to the traveling direction of the vehicle 10, the determining unit 231 determines that the line of sight direction of the driver is within the left-right reference range. When the line of sight direction of the driver is within the predetermined angle range on the upper side or within the predetermined angle range on the lower side with respect to the traveling direction of the vehicle 10, the determining unit 231 determines that the line of sight direction of the driver is within the upper-lower reference range.

When the line of sight direction of the driver is in the left-right and upper-lower reference ranges (step S202—Yes), the determining unit 231 determines that the level of participation of the driver in driving is high (step S203), and the series of processing steps is complete.

When the line of sight direction of the driver is neither in the left-right reference range nor in the upper-lower reference range (step S202—No), the determining unit 231 determines that the driver is distracted (step S204).

The determining unit 231 then determines that the level of participation of the driver in driving is low (step S205), and the series of processing steps is complete.

In the example described above, it was determined that the driver was distracted based on the line of sight direction of the driver, but alternatively it may be determined that the driver is distracted based on the driver's gaze position or the orientation of the driver's face.

Figure 5:
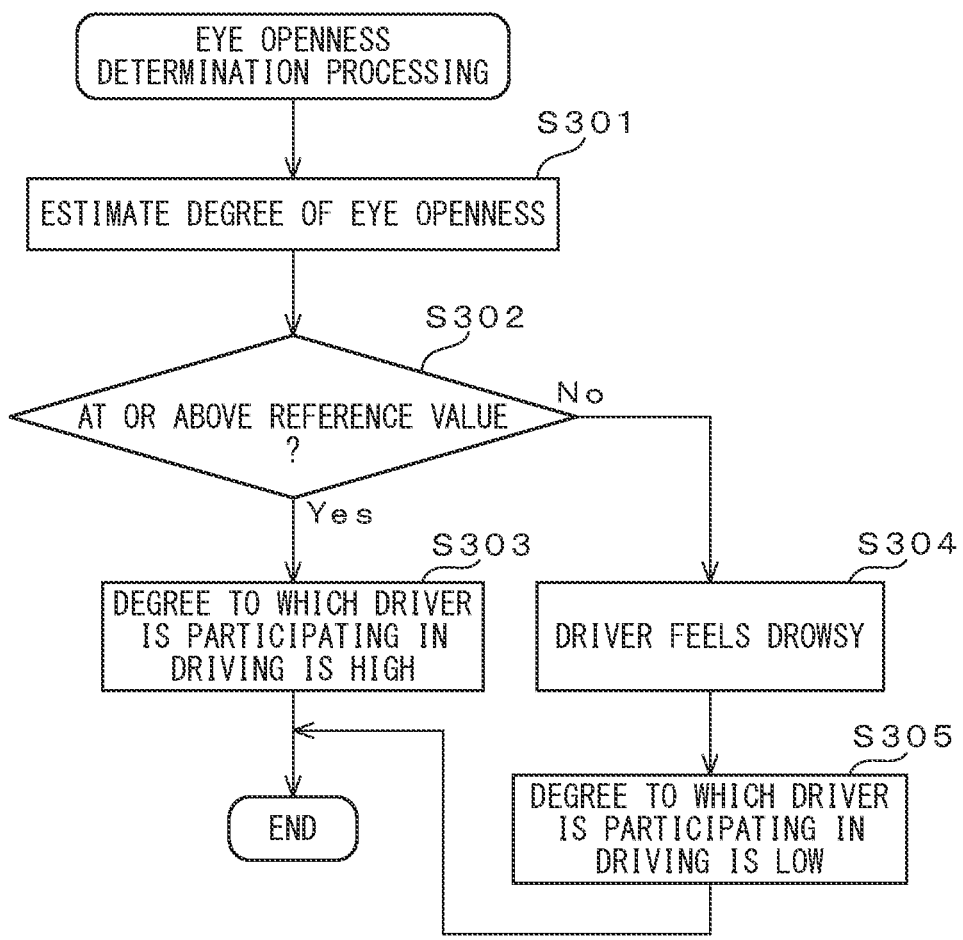
FIG. 5 is an example of an operation flow chart for eye openness determination processing by the monitoring device of the embodiment.

Alternative determination processing for determining the degree to which the driver is participating in driving will now be explained with reference to FIG. 5. FIG. 5 is an example of an operation flow chart for eye openness determination processing by the monitoring device of the embodiment. The monitoring device 12 carries out eye openness determination processing according to the operation flow chart shown in FIG. 5, at an eye openness determining time at a predetermined cycle. The cycle of the eye openness determining time is preferably shorter than the cycle of the monitoring time. Eye openness determination processing is an example of drowsiness determination processing.

First, the estimating unit 233 estimates the degree of eye openness of the driver, based on multiple monitor images obtained within the most recent fixed time period (step S301). The estimating unit 233 has a construction including a classifier trained to detect eye regions by input of monitor images. The classifier inputs monitor images and detects the eye regions within the monitor images.

The classifier is a convolutional neural network (CNN) having multiple layers connected in series from the input end to the output end, for example. Images including eyes are previously input into the CNN as teacher data for learning, whereby the CNN is able to function as a classifier to detect eye regions. A machine learning model such as a support vector machine or random forest may also be used as the classifier.

The estimating unit 233 calculates the degree of eye openness as the average value of the distance between the upper eyelids and lower eyelids of both the left and right eyes in each of the monitor images. The estimating unit 233 determines the average value for the degree of eye openness based on multiple monitor images obtained within the most recent fixed time period. The estimating unit 233 uses the average value for the degree of eye openness as the degree of eye openness for the driver.

The determining unit 231 then determines whether or not the degree of eye openness of the driver is at or above a predetermined reference value (step S302). If the degree of eye openness of the driver is at or above the reference value it is estimated that the eyes of the driver are open. If the degree of eye openness of the driver is below the reference value, on the other hand, it is estimated that the eyes of the driver are closed.

When the degree of eye openness of the driver is at or above the reference value (step S302—Yes), the determining unit 231 determines that the level of participation of the driver in driving is high (step S203), and the series of processing steps is complete.

When the degree of eye openness of the driver is below the reference value (step S302—No), on the other hand, the determining unit 231 determines that the driver feels drowsy (step S304).

The determining unit 231 then determines that the level of participation of the driver in driving is low (step S305), and the series of processing steps is complete.

In the example described above, it was determined that the driver was drowsy based on the degree of eye openness of the driver, but alternatively it may be determined that the driver is distracted based on the frequency of blinking of the driver, or the degree to which the driver's mouth is open.

As explained above, when a merging terrain J exists, the monitoring device of the embodiment alerts the driver to be attentive to the vehicle surroundings even if the speed of the vehicle is at or below the predetermined reference speed, and can thereby motivate the driver to be attentive to the surroundings of the vehicle.

Figure 6:
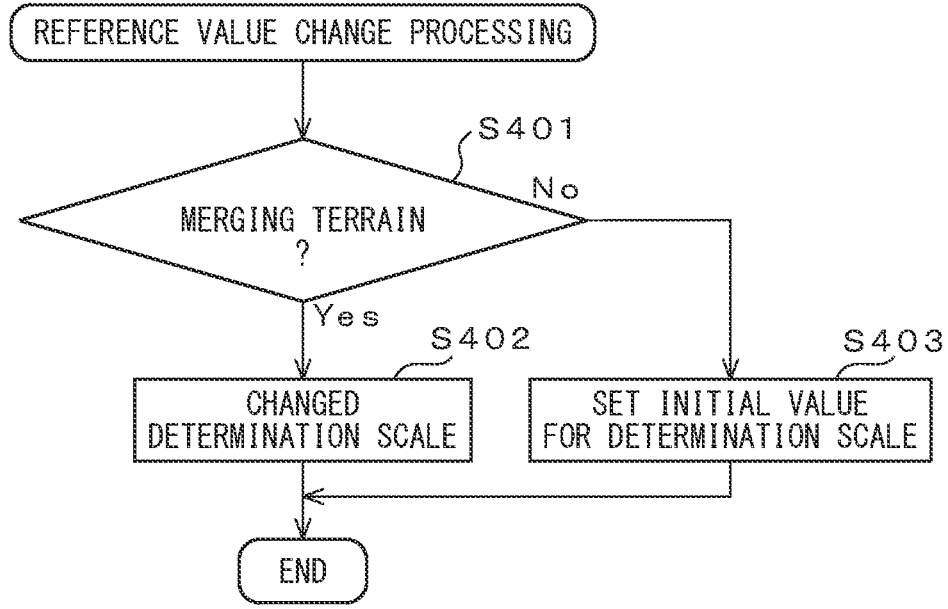
FIG. 6 is an example of an operation flow chart for reference value change processing by the monitoring device of the embodiment.
Figure 7:
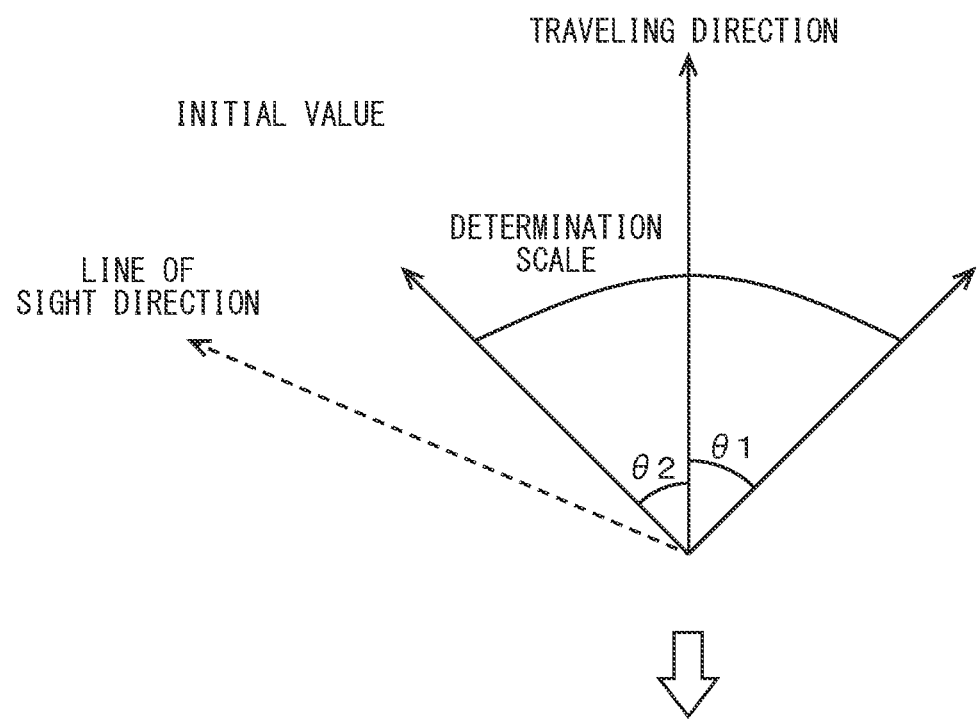
FIG. 7 is a diagram illustrating reference value change processing by a monitoring device of the embodiment.

A modified example of the monitoring device 12 of this embodiment will now be described with reference to FIG. 6 and FIG. 7. FIG. 6 is an example of an operation flow chart for reference value change processing by the monitoring device 12 of the embodiment. FIG. 7 is a diagram illustrating reference value change processing by a monitoring device 12 of the embodiment.

The monitoring device 12 carries out reference value change processing according to the operation flow chart shown in FIG. 6, at a reference value change time at a predetermined cycle. The cycle for the reference value change time may be from 10 to 60 seconds, for example.

According to this modified example, when a merging terrain exists within a predetermined range from the current location of the vehicle 10 in the traveling direction, the monitoring device 12 changes the determination scale based on the current location and the location of the merging terrain of the vehicle 10.

First, the determining unit 231 determines whether or not a merging terrain exists where an adjacent lane that is adjacent to the traveling lane in which the vehicle 10 is traveling vanishes by merging with the traveling lane, within a predetermined range ahead on the course of the vehicle 10 from the current location of the vehicle 10 (step S401). Specifically, the determining unit 231 determines whether or not a merging terrain exists within the nearest driving zone of the navigation route, based on the current location of the vehicle 10, the navigation route and the map information.

When a merging terrain exists (step S401—Yes), the changing unit 234 changes the determination scale for the direction in which the driver is gazing based on the current location of the vehicle 10 and the location of the merging terrain (step S402), and the series of processing steps is complete.

When no merging terrain exists (step S401—No), the changing unit 234 sets the determination scale to the initial value (step S403), and the series of processing steps is complete.

In step S202 for gaze determination processing described above, either a changed or set determination scale is used for reference value change processing.

When no merging terrain exists, the determination scale is set to the initial value, as shown in FIG. 7. The determination scale for the left-right direction of the line of sight is set to the range of angle $\theta 1$ for the right side or the reference range of angle $\theta 2$ for the left side, with respect to the traveling direction of the vehicle 10. Angle $\theta 1$ and angle $\theta 2$ may be the same or different. When the line of sight direction is outside of the reference range, it is determined that the driver is distracted.

When a merging terrain exists, on the other hand, the driver may be looking in the direction of an adjacent lane that vanishes by merging with the traveling lane.

In this case, if the initial values for the determination scale are used it will be determined that the driver is distracted since the line of sight direction is outside of the reference range. The monitoring device 12 gives a notification to the driver to be attentive to the surroundings of the vehicle 10.

However, the driver may feel unpleasantness at receiving the notification since they are already being attentive to the surroundings of the vehicle 10.

Therefore, the changing unit 234 changes the determination scale for the direction in which the driver is gazing based on the current location of the vehicle 10 and the location of the merging terrain.

The changing unit 234 may change the determination scale for the current location of the vehicle 10 so that the line of sight direction is included in the determination scale if the driver has their line of sight directed toward the adjacent start location of the merging terrain.

When the adjacent start location 62 is to the left of the vehicle 10 as shown in FIG. 1, the changing unit 234 changes the angle $\theta 2$ on the left side to angle $\theta 3$ which is larger than angle $\theta 2$, as the reference range for the left-right direction of the line of sight. This places the line of sight direction of the driver within the reference range according to the changed determination scale.

When the line of sight direction of the driver is within the reference range, the driver is not notified to be attentive to the surroundings of the vehicle 10. This can help prevent the monitoring device 12 from causing the driver to feel unpleasantness at receiving notifications.

The monitoring device, computer program for monitoring and monitoring method according to the embodiments described in the present disclosure may incorporate appropriate modifications that still fall within the gist of the disclosure. Moreover, the technical scope of the disclosure is not limited to these embodiments, and includes the invention and its equivalents as laid out in the Claims.

For example, monitor images were used in the embodiment described above as information representing the state of the driver, but the information representing the state of the driver is not limited to such images. The information representing the state of the driver may be the posture of the driver, for example. The posture of the driver can be estimated using position and posture in the driving seat.

Moreover, according to the embodiment described above it was determined that the degree to which the driver is participating in driving is low when the driver is distracted, or when the driver feels drowsy. The determination scale for determining the degree to which the driver is participating in driving is not limited to this method, however. Alternatively, the degree to which the driver is participating in driving may be determined based on the posture of the driver, for example.

The invention claimed is:

1. A monitoring device comprising:
a processor configured to
    determine a degree to which a driver is participating in driving,
    determine whether or not a merging terrain exists in which an adjacent lane that is adjacent to a traveling lane in which a vehicle is traveling vanishes by merging with the traveling lane, within a predetermined range from a current location of the vehicle in a traveling direction, and
    alert the driver to be attentive to the vehicle surroundings only based on determining that the merging terrain exists, determining that the degree to which the driver is participating in driving is low, and a speed of the vehicle does not exceed a reference speed.

2. The monitoring device according to claim 1, wherein the processor is further configured to determine that the degree to which the driver is participating in driving is low when the driver is distracted or the driver feels drowsy.

3. The monitoring device according to claim 2, wherein the processor is further configured to
    determine whether or not the driver is distracted using a determination scale for a direction in which the driver is gazing, and
    change the determination scale based on the current location of the vehicle and the location of the merging terrain, when it has been determined that the merging terrain exists.

4. The monitoring device according to claim 1, wherein the reference speed is in a range of 10 kilometer/hour to 20 kilometer/hour.

5. A computer-readable, non-transitory storage medium storing a computer program for monitoring, which causes a processor to execute a process, the process comprising:
    determining a degree to which a driver is participating in driving;
    determining whether or not a merging terrain exists in which an adjacent lane that is adjacent to a traveling lane in which a vehicle is traveling vanishes by merging with the traveling lane, within a predetermined range from a current location of the vehicle in a traveling direction; and
    alerting the driver to be attentive to the vehicle surroundings based on determining that the merging terrain exists, determining that the degree to which the driver is participating in driving is low, and a speed of the vehicle does not exceed a reference speed.

6. A monitoring method carried out by a driver monitoring device and the method comprises:
    determining a degree to which a driver is participating in driving;
    determining whether or not a merging terrain exists in which an adjacent lane that is adjacent to a traveling lane in which a vehicle is traveling vanishes by merging with the traveling lane, within a predetermined range from a current location of the vehicle in a traveling direction; and
    alerting the driver to be attentive to the vehicle surroundings based on determining that the merging terrain exists, determining that the degree to which the driver is participating in driving is low, and a speed of the vehicle does not exceed a reference speed.

* * * * *